United States Patent
Boccotti et al.

(10) Patent No.: US 11,838,144 B2
(45) Date of Patent: Dec. 5, 2023

(54) ASSISTED COOKING CALIBRATION OPTIMIZER

(71) Applicant: WHIRLPOOL CORPORATION, Benton Harbor, MI (US)

(72) Inventors: Alessandro Boccotti, Biandronno (IT); Alessandro Caruso, Romentino (IT); Stefano Moroni, Laveno Mombello (IT); David R. Vehslage, Baroda, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/575,113

(22) Filed: Jan. 13, 2022

(65) Prior Publication Data

US 2023/0224185 A1  Jul. 13, 2023

(51) Int. Cl.
| | |
|---|---|
| H04L 12/28 | (2006.01) |
| G06F 16/55 | (2019.01) |
| G06F 16/583 | (2019.01) |
| H04L 67/125 | (2022.01) |

(52) U.S. Cl.
CPC .......... *H04L 12/282* (2013.01); *G06F 16/55* (2019.01); *G06F 16/583* (2019.01); *H04L 67/125* (2013.01); *H04L 2012/285* (2013.01)

(58) Field of Classification Search
CPC .......... H04L 12/282; H04L 67/125; H04L 2012/285; G06F 16/55; G06F 16/583
See application file for complete search history.

(56) References Cited

U.S. PATENT DOCUMENTS

| | | |
|---|---|---|
| 6,320,169 B1 | 11/2001 | Clothier |
| 9,412,048 B2 | 8/2016 | Guan et al. |
| 9,449,220 B2 | 9/2016 | Guan |
| 10,025,282 B1 | 7/2018 | Wilkinson |
| 10,092,129 B2 | 10/2018 | Jenkins et al. |
| 10,518,409 B2 | 12/2019 | Oleynik |
| 10,595,660 B2 | 3/2020 | Patadia |
| 10,845,060 B2 | 11/2020 | Bhogal et al. |
| 2011/0253693 A1 | 10/2011 | Lyons et al. |
| 2013/0171304 A1* | 7/2013 | Huntley ............... F24C 7/08 434/127 |
| 2015/0182058 A1* | 7/2015 | Jeong .................. H05B 6/6447 99/342 |
| 2015/0250027 A1* | 9/2015 | Takano ................. H05B 6/062 219/664 |

(Continued)

FOREIGN PATENT DOCUMENTS

| | | |
|---|---|---|
| DE | 112013007526 T5 | 7/2016 |
| EP | 2094059 A2 | 8/2009 |
| WO | 2011089901 A1 | 7/2011 |

*Primary Examiner* — Charles R Kasenge
(74) *Attorney, Agent, or Firm* — Price Heneveld LLP

(57) ABSTRACT

A method for calibrating an induction cooking device includes capturing image data representing a cooking vessel and processing the image data to identify one or more features. The method further includes comparing the image data representing the cooking vessel to a library of stored image data of calibrated cookware. In response to identifying stored image data in the library that matches the one or more features, the method accesses preconfigured calibration data and configures the operation of the induction cooking device based on the preconfigured calibration data.

18 Claims, 7 Drawing Sheets

(56) References Cited

U.S. PATENT DOCUMENTS

| | | | |
|---|---|---|---|
| 2016/0005329 A1* | 1/2016 | Sako | G09B 5/02 |
| | | | 434/127 |
| 2017/0055755 A1* | 3/2017 | Wu | A47J 36/00 |
| 2017/0299194 A1* | 10/2017 | Kamei | F24C 7/08 |
| 2019/0289678 A1* | 9/2019 | Nam | H05B 6/1209 |
| 2020/0085225 A1* | 3/2020 | Kim | H05B 6/062 |
| 2021/0251263 A1 | 8/2021 | Knighton et al. | |

\* cited by examiner

ASSISTED COOKING CALIBRATION OPTIMIZER

BACKGROUND OF THE DISCLOSURE

The present disclosure generally relates to a system and method for operating and calibrating a cooking device and, more specifically, to a method for calibrating a cooking device via a vision-based recognition or detection routine.

SUMMARY OF THE DISCLOSURE

According to one aspect of the present disclosure, a cooking device is disclosed comprising a cooking surface configured to support a cooking vessel having at least one heating element disposed beneath the cooking surface. The cooking device is configured to generate heat in the cooking vessel. A communication circuit is in communication with a remote database. A controller is in communication with a driving circuit of the at least one heating element and the communication circuit. The controller is configured to access a calibration routine for the cooking vessel and, in response to the calibration routine, receive calibration data for the cooking vessel from the remote database. In response to the calibration data, the controller configures the operation of the at least one heating element for the cooking vessel.

According to another aspect of the present disclosure, a method for calibrating an induction cooking device includes capturing image data representing a cooking vessel and processing the image data to identify one or more features. The method further includes comparing the image data representing the cooking vessel to a library of stored image data of calibrated cookware. In response to identifying stored image data in the library that matches the one or more features, the method accesses preconfigured calibration data and configures the operation of the induction cooking device based on the preconfigured calibration data.

According to yet another aspect of the present disclosure, a system for assisted calibration of an induction cooking device comprises a mobile device in communication with a remote server. The mobile device includes a camera configured to capture image data depicting a cooking vessel. The calibration data for the cooking vessel is accessed by the mobile device based on the image data. The system further includes a cooking appliance comprising a control module in communication with the remote server via a communication interface. The control module receives the calibration data and loads the calibration data for a calibration procedure.

These and other features, advantages, and objects of the present disclosure will be further understood and appreciated by those skilled in the art by reference to the following specification, claims, and appended drawings.

Figure 1B:
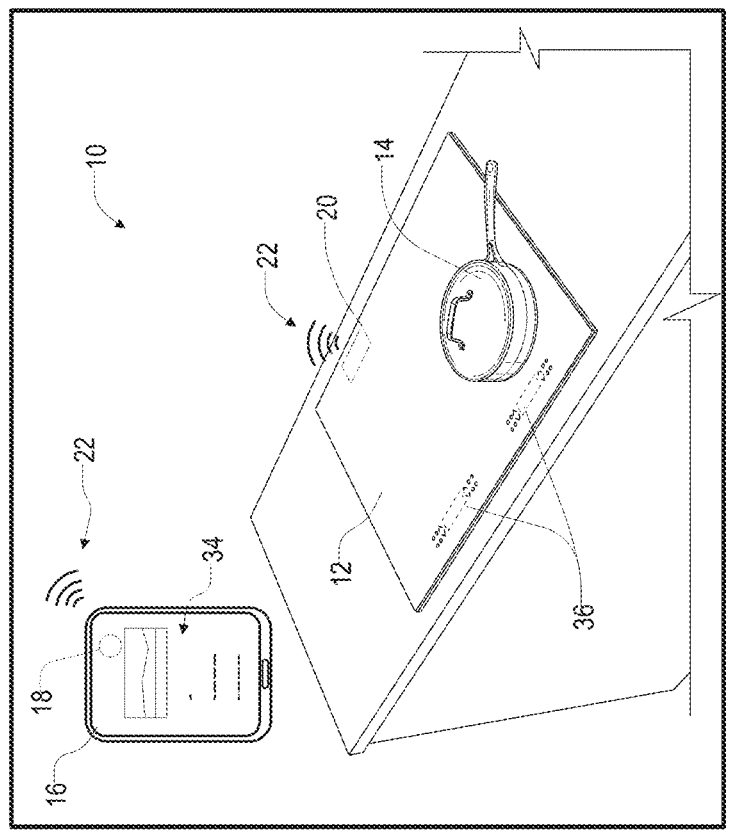
FIG. 1B is a representation of a mobile device communicating with a controller of a cooking device to complete an assisted calibration operation.

The components in the figures are not necessarily to scale, emphasis instead being placed upon illustrating the principles described herein.

DETAILED DESCRIPTION

The present illustrated embodiments reside primarily in combinations of method steps and apparatus components related to a vision-based cookware calibration system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-7, the application provides for a method and system 10 for calibrating cookware for operation with an induction cooking device 12. In general, the purpose of calibration of cookware, represented as a cooking vessel 14, is to produce improved cooking functionality. The improved operation primarily relates to the normalization of cooking settings over a wide range of cookware. In operation, effective calibration provides for the settings (e.g., low, medium, high, 1-10, etc.) to consistently correspond to the same intensity of heat energy communicated into or generated in each piece of cookware. In this way, the settings of the cooking device 12 may be applied uniformly to consistently induce cooking temperatures, rates of change of temperature, and other heating properties in cookware of various proportions, metal compositions, and other characteristics that may differ among cooking implements.

The primary aspect of the disclosure that is introduced in the following description relates to the operation of the system 10 and the related methods of identifying at least preliminary calibration results for the associated cookware without requiring local calibration. In some cases, local calibration may require complicated and sometimes tedious local heating and testing routines to determine accurate calibration results for each vessel 14 or cooking implement. However, the disclosure limits and may be implemented to replace calibration routines to reduce setup and preparation time while also improving accessibility of advanced cooking features, such as assisted or interactive recipe guidance. Accordingly, the disclosed system 10 and associated methods may provide for an enhanced cooking experience while limiting complexity and setup time associated with the cooking device 12.

Figure 1A:
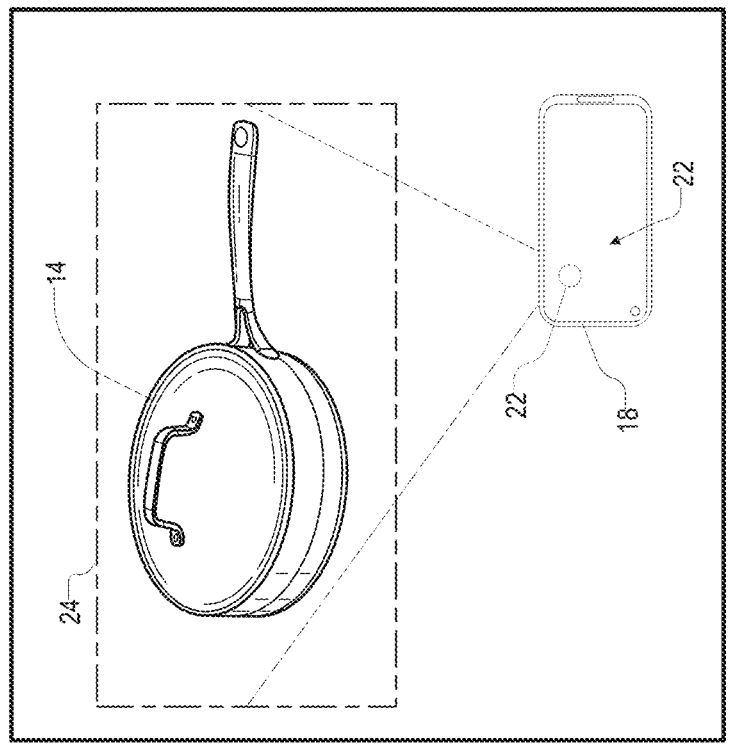
FIG. 1A is a representation of a mobile device capturing image data representing a cooking vessel.
Figure 2:
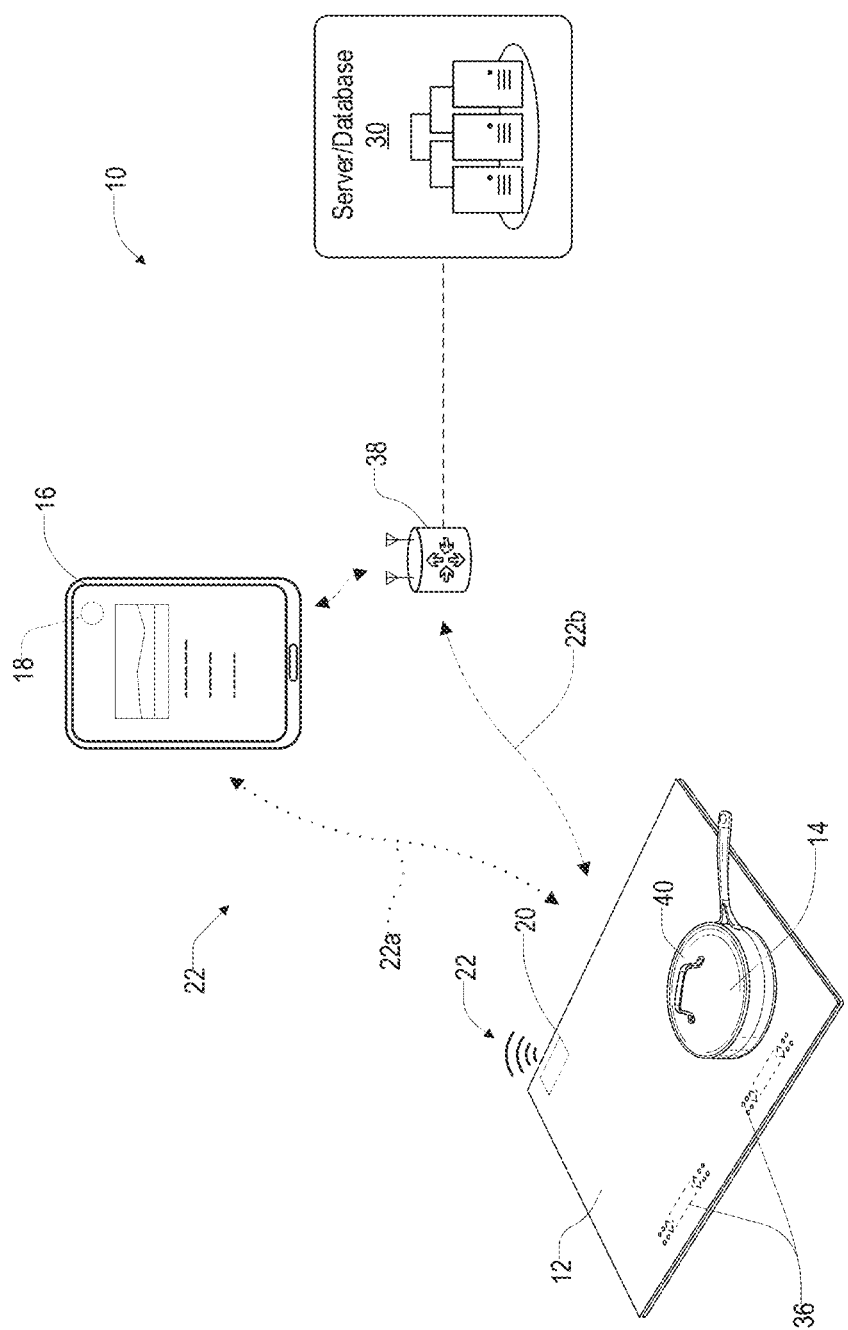
FIG. 2 is a schematic diagram of a cooking device and system for processing an assisted cooking calibration routine.

Referring now to FIGS. 1A, 1B, and 2, an exemplary representation of the system 10 is shown. As shown, the calibration routine may be facilitated by the operation of a calibration application that may operate on a mobile device 16 (e.g., tablet, computer, smartphone) with a camera 18 or imaging device. The mobile device 16 may be in communication with a database 30 (e.g., a remote database, remote server, local database, etc.) and a controller 20 of the cooking device 12 via at least one communication interface 22 as discussed later in specific reference to FIG. 2. In this configuration, an application operating on the mobile device 16 may provide an interface by which a user of the cooking device 12 can capture image data 24 depicting the cooking vessel 14 as well as input/select identification information (e.g., classification, description, size, manufacturer, model designation, etc.) identifying the cooking vessel 14. This identification information may then be communicated to a remote server 30 that may compile a library of stored image data and identifying information for a wide variety of cookware. As described in various examples, the stored image data and identifying information may be implemented by the system 10 to assist in a variety of calibration procedures and assisted cooking operations to enhance and improve the operation of the cooking device 12.

As shown in FIGS. 1A and 1B, a representative assisted calibration procedure is discussed in reference to the operation of the mobile device 16 in coordination with the cooking device 12. As shown in FIG. 1A, the application operating on the mobile device 16 may assist a user in activating the camera 18 to capture image data 24 depicting the cooking vessel 14. The capture of the image data 24 may be initiated via one or more steps to process a calibration routine for the cooking vessel that may be entered via a user interface 34 of the mobile device 16 and/or a user interface 36 of the cooking device 12. Once the image data 24 depicting the cooking vessel is captured with the camera 18 of the mobile device 16, the application of the mobile device 16 may communicate the image data 24 to the remote server 30, where the image data 24 may be processed via one or more object detection algorithms, trained models, neural networks, or various other software-based image processing algorithms. Though discussed primarily in reference to processing the image data 24 via the remote server 30, it shall be understood that the mobile device 16 and/or various computerized devices in communication with the communication interface 22 may access an associated cookware database to process the identification of the cooking vessel 14.

The objective of the detection algorithms may be to associate the cooking vessel 14 depicted in the image data 24 with a category, type, or model of a stored cooking vessel already stored in the library or database of the remote sever 30. For each stored cooking device, the library or database may include descriptive information (e.g., classification, description, size, manufacturer, model designation, etc.) as well as calibration data that may identify the size/proportions, heat retention, temperature response to various driving frequencies, rates of change of temperature, and other heating properties associated with each of the stored cooking vessels in the database. The descriptive information and calibration data may be initially supplemented with manufacturer test data for the cooking device 12 or similar devices and may also be modified and improved over time by capturing anonymous data captured by users of the cooking device 12 as discussed further in reference to the detailed operation of the system 10 that follows.

If the description information and/or calibration data for the cooking vessel 14 depicted in the image data 24 is identified in the database, remote server 30 may access the associated data and communicate the date to the mobile device 16 and/or the controller 20 of the cooking device 12. In cases where the calibration data is communicated to the mobile device 16, the information may further be communicated to the controller 20 of the cooking device 12 indirectly from the remote server 30. The descriptive information and calibration data may be stored by the application operating on the mobile device 16 to create an entry into a cookware library associated with a profile of the user. In this way, a user of the system 10 may implement the assisted calibration routine to label and store the descriptive information and calibration data for each piece of cookware used with the cooking device 12, such that associated image, descriptive information, and calibration data associated with the cookware can be accessed and applied for use with the cooking device 12 via the mobile device 16 and/or the user interface 36 of the cooking device 12. In this way, a user of the system 10 may easily access and assign the operation of the cooking device 12 to operate based on the calibration data associated with each piece of cookware that is used on the cooking device 12.

If the description information and/or calibration data for the cooking vessel 14 depicted in the image data 24 is not identified in the library or database of the remote server, the mobile device 16 and the controller 20 of the cooking device 12 may operate in combination to process a local calibration routine and communicate the calibration data, image data 24, and descriptive information for the cooking vessel to the database or server 30. For example, once the mobile device 16 receives an indication that the calibration data for the cooking vessel 14 is not available or cannot be identified by the remote server 30, the application operating on the mobile device 16 may communicate an instruction to the controller 20 of the cooking device 12 to complete a local calibration routine (e.g., heating the cooking vessel and identifying the temperature response) for the cooking vessel 14. Upon completion of the calibration routine, the controller 20 may communicate the calibration data to the mobile device 16 and/or the remote server 30. Additionally, the image data 24 depicting the cooking vessel 14 as well as the descriptive information, category, and any other relevant information related to the cooking vessel 14 may be communicated to the remote server 30. The remote server 30 may then populate the cookware library or database with the calibration data, image data 24, and descriptive information for later identification via the image-based or computer vision detection and categorization software as previously discussed.

In various implementations, the application operating on the mobile device 16 may be a module of or implemented in combination with a food preparation application (e.g., a software application or app). Depending on the capability of the mobile device 16 and the cooking device 12, the food preparation application and the calibration application may be displayed on or operate via each of the user interfaces 34, 36 and corresponding displays, touchscreens, user inputs, etc. For example, the applications may provide for interactive instructions (e.g., audible, visual instructions, videos, animations, text descriptions, etc.) of each step of a recipe or the calibration routine. The extent of the operation on the mobile device 16, the cooking device 12, and various devices (e.g., tablets, computers, smartphones, smart home hubs, etc.) may depend on the capability (e.g., processing power, memory, display interface capability, etc.) of each of the corresponding devices. In order to synchronize the operation of the applications, each of the devices may be in communication via the one or more communication interfaces 22 as later discussed in reference to FIG. 2. In this way, the system 10 may provide for distributed or coordinated operation of the various routines and methods described herein.

As discussed herein, a calibration process associated with the cooking device 12 may include a procedure that adjusts the driving frequencies applied to induction coils heating the cooking vessel 14 via an induction drive circuit(s). The induction drive circuit(s), induction coils, and temperature sensors are shown and further discussed in reference to FIG. 7. In response to the changes in the driving frequency, the controller 20 of the cooking device 12 may monitor the temperature response of the cooking vessel 14. In some cases, the cooking vessel 14 may be filled with a simulated food load (e.g., water) and the routine may monitor the temperature response of the cooking vessel 14 over time to determine the associated frequencies for inducing the electromagnetic field in the cooking vessel to effectuate the desired heating response. The resulting calibration may be captured in a table of calibration coefficients that associate the driving frequencies with the temperature response of the cooking vessel 14. Once the calibration is completed, the controller 20 may tune or offset the settings of the induction drive system so that the heat settings of the cooking device 12 are applied consistently among various cookware with differing proportions and compositions. While this process is effective in determining accurate operating characteristics among pieces of cookware, the associated procedure may require an extended period of time to complete (e.g., 20-30 minutes).

Referring now to FIG. 2, the communication interface 22 of the system 10 may correspond to a plurality of communication interfaces 22a, 22b, which may be implemented using various communication protocols. In some implementations, the communication interfaces 22 may include a first communication interface 22a, which may provide communication between the cooking device 12 and the mobile device 16. Additionally, the mobile device 16 may be in communication with the database 30 (e.g., cloud database) via a second communication interface 22b, which may be in communication with the internet or an internet-connected device. The second communication interface 22b may correspond to a local network and may be implemented to provide for distributed communication among a wide range of mobile devices 16 or connected devices (e.g., computers, tablets, smartphones, etc.) and the controller 20 of the cooking device 12 via a communication hub or router 38 (e.g., a Wi-Fi router). Additionally, the second communication interface 22b may include a combination of wired connections (e.g., Ethernet®) as well as wireless networks interfaces.

In various examples, the first communication interface 22a may be implemented via to a first communication protocol that communicatively couples with the second communication interface 22b via one or more of the mobile device(s) 16. In such implementations, the first communication interface 22a may utilize Bluetooth®, Bluetooth® Low Energy (BLE), Thread, Ultra-Wideband, Z-Wave®, ZigBee®, or similar communication protocols. The second communication interface 22b may be implemented via a different wireless communication protocol than the first communication interface 22a. For example, the second communication interface 22b may be implemented via a global system for mobile communication (GSM), general packet radio services (GPRS), code division multiple access (CDMA), enhanced data GSM environment (EDGE), fourth-generation (4G) wireless, fifth-generation (5G) wireless, Wi-Fi, world interoperability for microwave access (WiMAX), local area network (LAN), Ethernet®, etc. Though discussed as implementing different wireless communication protocols, the first and second communication interfaces 22a, 22b may alternatively be implemented as a single, common communication interface and protocol (e.g., a home Wi-Fi network).

In addition to the mobile device 16 and the cooking device 12, the cooking vessel 14 may additionally include an identification device 40 that may comprise a microprocessor, controller, or other identification tags or circuits that may communicate with the cooking device 12, the mobile device 16, and/or the remote server via the communication interface 22. Though depicted only generally in FIG. 2, the identification device may be connected to or incorporated in a body or handle of the cooking vessel 14 and may include passive or active circuitry. For example, the identification device 40 may be activated in response to one or more communication signals from the cooking device 12 and/or the mobile device 16 via the communication interface. Additionally, the identification device 40 may be activated in response to heat energy supplied by the cooking device 40. In operation, the identification device 40 may communicate preliminary calibration data that may be supplied/programmed in a memory by the manufacturer. The identification device 40 may further communicate descriptive or identifying information (e.g., classification, description, size, manufacturer, model designation, etc.) identifying the cooking vessel 14. The calibration data and/or the identifying information for the cooking vessel 14 may be communicated to the cooking device 12 and/or the mobile device 16 to populate the user set up and configuration of the cooking vessel 14 for calibrated operation with the system 10 as discussed herein.

Figure 3:
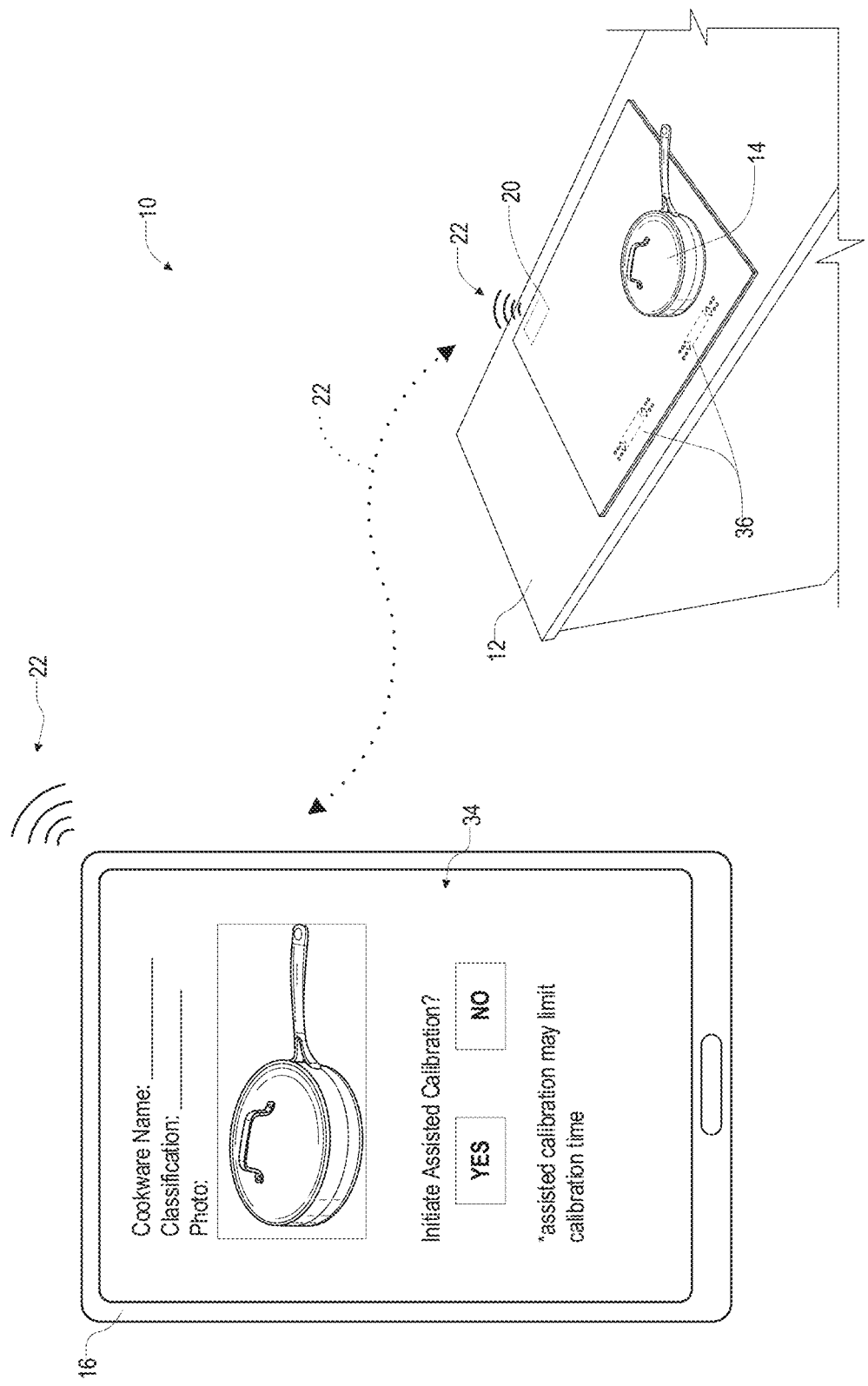
FIG. 3 is a graphic representation of a mobile device in communication with a controller of a cooking device implementing an assisted calibration routine.
Figure 4:
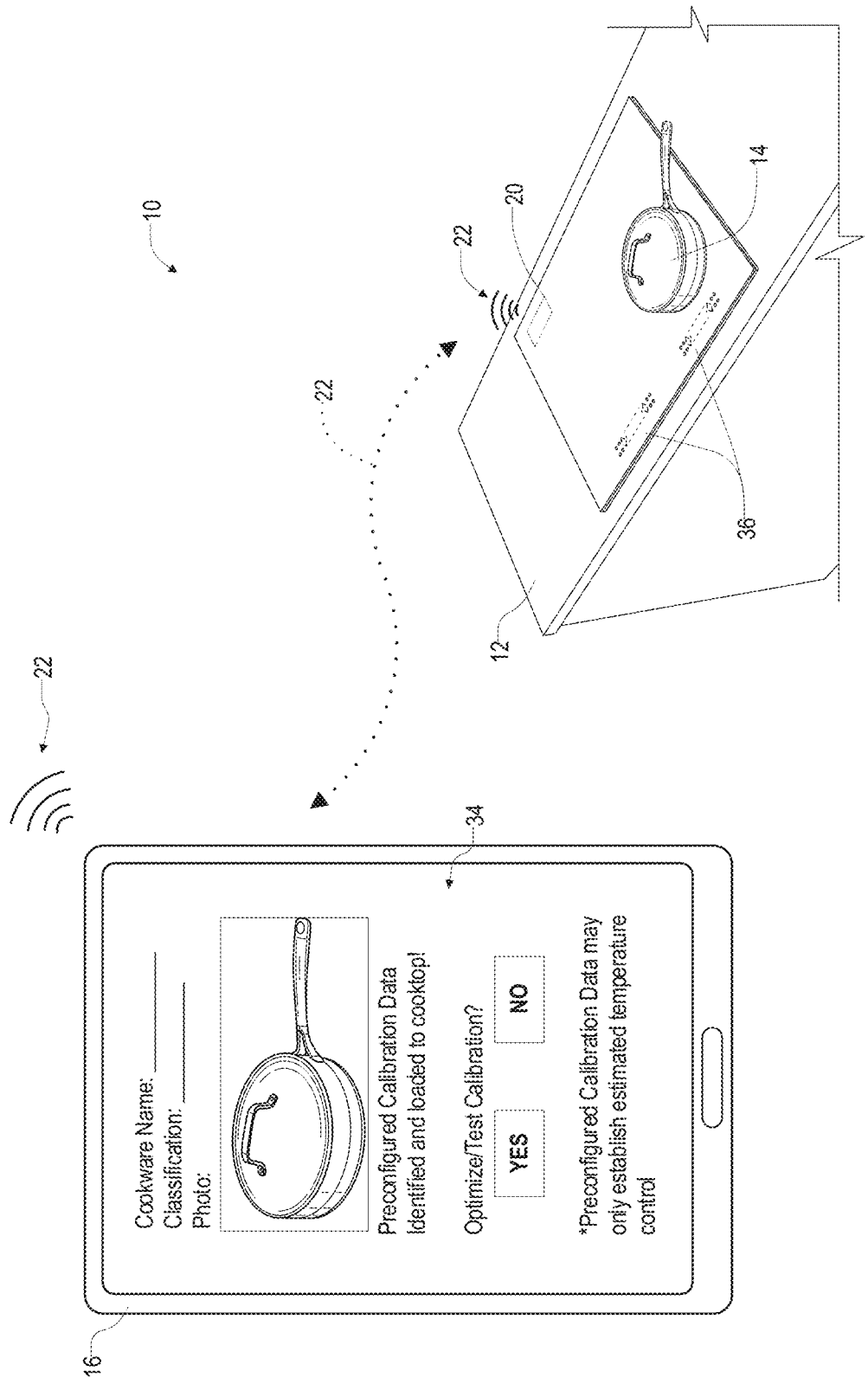
FIG. 4 is a graphic representation of a mobile device in communication with a controller of a cooking device implementing an assisted calibration routine.

Referring now to FIG. 3, the mobile device 16 of the system is shown in communication with the controller 20 of the cooking device 12. As previously discussed, a software program or application may be operated on the mobile device 16 to assist and guide a user through a variety of interactive steps to complete the assisted cooking calibration routine. The image represented on the user interface 34 of the mobile device 16, represented in FIG. 3, may follow an instruction to capture image data 24 as demonstrated previously in FIG. 1A. Once the image data 24 is captured by the mobile device 16, the user interface 34 representing the application operating on the mobile device 16 may instruct a user to input various information related to the cooking vessel 14. For example, a user may be prompted to enter or select a cookware name, classification, and various size or descriptive information related to the cooking vessel 14. Additionally, the user may be prompted to select whether or not to initiate an assisted calibration routine as depicted.

Upon selecting the activation of the assisted cooking calibration routine, the mobile device 16 may communicate the image data 24 and the descriptive or identifying information for the cooking vessel 14 to the remote server 30. Once the image data 24 is received by the remote server 30, the server 30 may apply one or more image or vision-based object detection algorithms (e.g., trained models, neural networks, edge and pattern detection, etc.) to attempt to identify a stored cooking vessel in a library or database stored or accessible via the remote server 30 that matches or is similar to the cooking vessel 14 depicted in the image data 24. As demonstrated in FIG. 4, if preconfigured calibration data is available for the cooking vessel 14, the remote server 30 may communicate an indication to the mobile device 16. In response to the indication that the preconfigured or previously identified calibration data for the cooking vessel 14 is identified, the mobile device 16 may output a corresponding indication on the user interface 34 of the mobile device 16 to notify the user. In some cases, the application may further assist or instruct the user in activating a further optimization or test of the calibration data received from the remote server 30. Such an optimization or test of the preconfigured calibration data may improve or modify the calibration data (e.g., calibration coefficients, material properties, etc.) based on differences between the performance of the specific cooking device 12 implemented and/or variations between the cooking vessel 14 and that associated with the preconfigured calibration data accessed via the remote server 30. Though additional optimization or testing of the calibration data received from the remote server 30 may be beneficial, the remaining local calibration steps performed by the controller 20 of the cooking device 12 may be limited and may only require one or more uniform adjustments or offsets applied to the calibration data received from the remote server 30.

Figure 5:
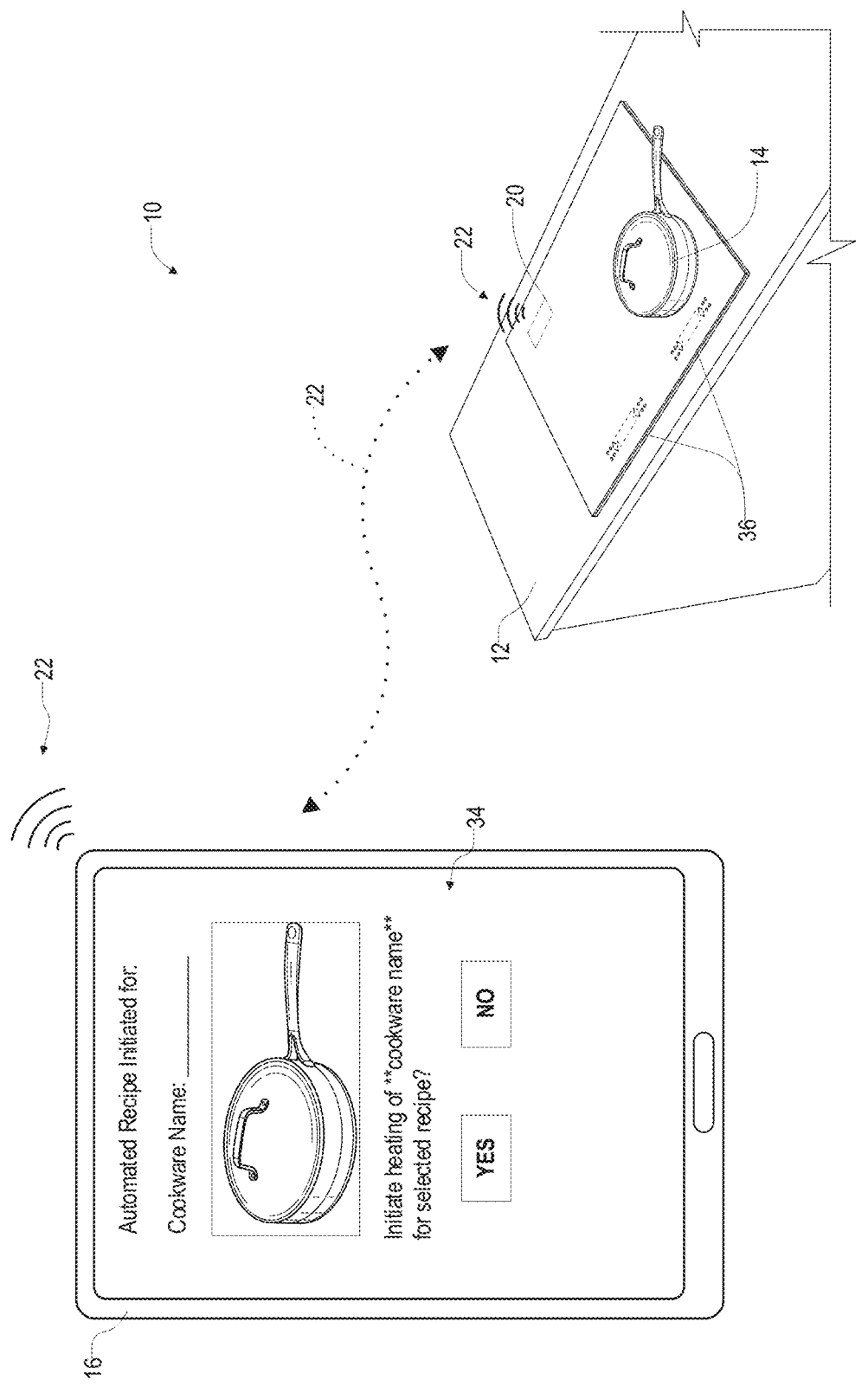
FIG. 5 is a graphic representation of a mobile device in communication with a controller of a cooking device implementing an assisted calibration routine.

In various cases, once the calibration or assisted calibration routine is completed for the cooking vessel 14, the system 10 may continue to provide various optional features related to automated or assisted food preparation or recipe instructions via the mobile device 16. As depicted in FIG. 5, the application may operate on the mobile device 16 to assist a user to implement one or more automated cooking functions associated with the cooking device 12. For example, once the calibration routine for the cooking vessel 14 is completed, each of the heat settings activated by the controller 20 via the induction drive circuits may correspond to normalized or known temperatures in the cooking vessel 14. For example, a medium heat setting associated with an automated recipe may consistently correspond to a steady state cooking temperature of the cooking vessel 14 associated with a simmer, sauté, or various associated cooking temperatures as necessary to implement the recipe. Accordingly, the application operating on the mobile device 16 may be implemented to activate one or more automated cooking instructions or cooking routines on the controller 20. As shown, the user interface 34 may request a user input to activate a heating function for the cooking device 12 to implement such a routine. Additionally, based on the communication with the controller 20 of the cooking device 12 via the communication interface 22, the mobile device 16 may monitor the temperature and time associated with each of a plurality of cooking steps and engage a user of the mobile device 16 to parse or work through a plurality of recipe steps that may be triggered in response to the operating times and temperatures associated with the cooking vessel 14 heated by the cooking device 12. In this way, the calibration data supplied by the remote server 30 or otherwise implemented by the cooking device 12 may provide for various automated or assisted cooking activities to be implemented by the cooking device 12.

Figure 6:
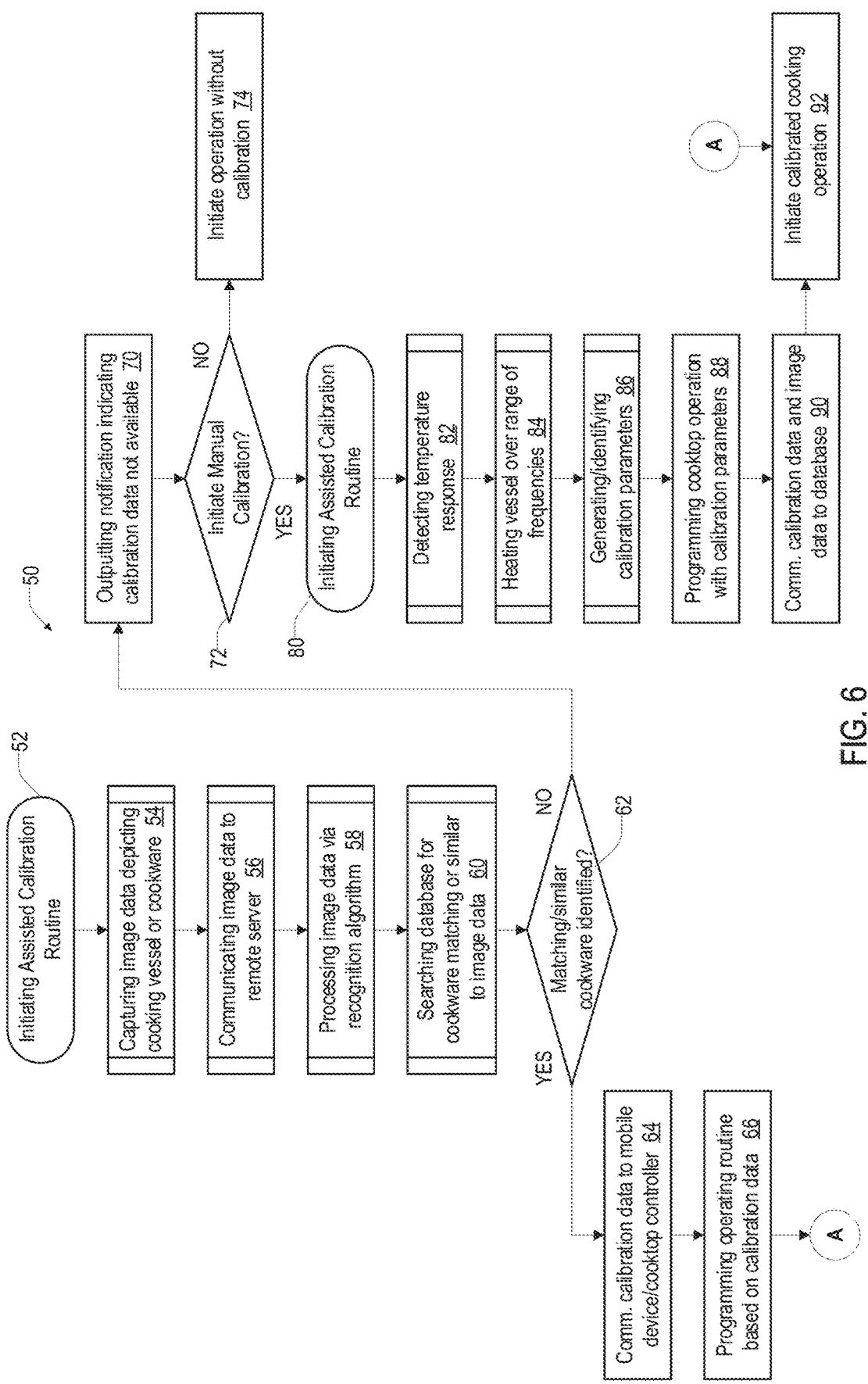
FIG. 6 is a flowchart demonstrating a method for implementing an assisted cooking calibration routine.

Referring now to FIG. 6, a flowchart 50 is shown demonstrating a method for an assisted calibration routine. As previously discussed, the calibration routine for the cooking vessel 14 may be initiated via the cooking device 12 and/or the mobile device 16 (52). In response to the initiation of the calibration routine, the application operating on the mobile device 16 may activate a camera or imaging device to capture image data 24 depicting the cooking vessel 14 or cookware (54). Once the image data 24 is captured by the mobile device 16, the application may control one or more communication circuits of the mobile device 16 to communicate the image data 24 and any additional associated identifying information or descriptive information associated with the cooking vessel 14 to the remote server 30 (56). Once received, the remote server 30 may process the image data 24 depicting the cooking vessel 14 via one or more image recognition algorithms to identify various visually identifiable characteristics of the cooking vessel 14 (58). Based on the characteristics of the cooking vessel 14, the remote server 30 may search a library or database of cookware to identify if a stored cooking vessel matches the image data 24 representing the cooking vessel 14. In step 62, if a stored cooking vessel matches the image data 24, the remote server 30 may communicate preconfigured or previously measured calibration data to the mobile device 16 and/or the controller 20 of the cooking device 12 (64). With the calibration data received, the controller 20 of the cooking device 12 may update an operating routine for the heating of the cooking vessel 14 based on the calibration data (66).

If a matching or stored cooking vessel is not identified in step 62, the method of flowchart 50 can continue by outputting a notification to the cooking device 12 or the mobile device 16 indicating that the calibration data was not available (70). Upon receiving a notification that preconfigured calibration data is not available for the cooking vessel 14, the mobile device 16 or the cooking device 12 may prompt a user to determine whether or not to initiate a manual or local calibration routine (72). If the user declines the manual calibration routine in step 72, the cooking device 12 may initiate an operation without calibration (74). Alternatively, if the user selects the manual calibration in step 72, the controller 20 of the cooking device 12 may initiate a local calibration routine (80).

As previously discussed, the local calibration routine 80 may include steps of adjusting the operating frequency of one or more induction drive circuits configured to control the operation of induction coils of the cooking device 12 as well as monitor the corresponding temperature response of the cooking vessel 14 as detected via one or more temperature sensors. Accordingly, the calibration routine 80 may include steps 82 and 84 that include detection of the temperature response and heating of the cooking vessel 14 over a range of driving frequencies. Once the range of frequencies and corresponding temperature response for the cooking vessel 14 is identified, the calibration routine 80 may generate or identify calibration parameters in a table or similar format (86). Once the calibration data associated with the cooking vessel 14 is identified, the controller 20 may program an operating routine of the drive circuits for the cooking device 12 in accordance with the calibration parameters (88). In addition to programming the operation of the controller 20, the calibration data may additionally be communicated to the remote server 30 and/or the mobile device 16 (90). Additionally, the controller 20 of the cooking device 12 may initiate a calibrated cooking operation in step 92.

As previously discussed, the calibration data communicated to the remote server 30 in step 90 may further be implemented to populate calibration data for various cooking devices. As previously discussed, the calibration data may be used in combination with the image data 24 and/or descriptive information input or selected via one of the user interfaces 34, 36 to populate a library or database of stored cooking vessel information. This way, the calibration data, image data, and associated operating information for various cooking vessels may be updated over time to improve the identification capability and robust operation of the system 10. Accordingly, by capturing this information over time, the system 10 may provide for an active learning operation that improves the capability of the assisted calibration routine shown in flowchart 50 over time.

Figure 7:
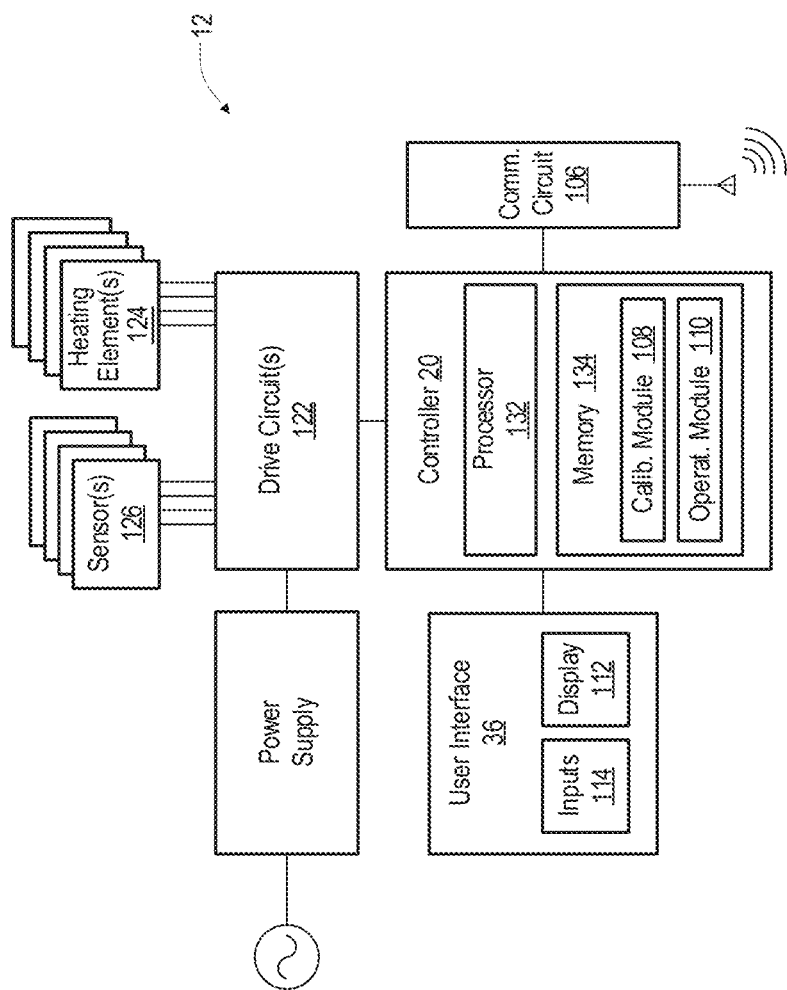
FIG. 7 is a block diagram demonstrating a cooking device for utilization with a system for processing an assisted cooking calibration routine in accordance with the disclosure.

Referring now to FIG. 7, a block diagram of an exemplary embodiment of the controller 20 of the cooking device 12 is shown. The controller 20 may comprise a processor 102, a memory 104, and one or more communication circuits 106. The processor 102 may correspond to one or more microprocessors, central processing units (CPUs), or other processors which run software programs or modules 108, 110 for the cooking device 12 or for other applications related to the functionality of cooking device 12. The memory 104 may correspond to a dedicated memory (e.g. RAM, ROM, Flash, etc.) and may further include a non-transient, computer readable medium, such as electronic memory or other storage medium such as hard disk, optical disk, flash drive, etc., for use with the processor 102. In this configuration, different operating instructions or software may provide for the operation of the cooking device 12, such as menu navigation software, drive control, and/or a wide variety of operational features. In the exemplary embodiments discussed herein, the assisted calibration 52 and the local calibration routine 80 may be stored in a calibration module 108 and the operating routines for controlling the operation of the cooking device 12 may be stored in an operating module 110.

With the exception of the limited features that may necessarily be controlled via the controller 20 (e.g., timing for induction heating and feedback), the control structure for each of the calibration routines discussed herein may be distributed among one or more of the controller 20, mobile device 16 or similar connected devices, and the remote server 30. For example, the calibration data may be communicated directly to the controller 20 or communicated to the mobile device 16 then to the controller 20 indirectly from the remote server 30. Additionally, various operations (e.g., user inputs, prompts, processing steps) may be implemented in the mobile device 16 or the controller 20 based on a level of sophistication of the underlying hardware. For example, the user interface 34 of the mobile device 16 may be implemented because of the convenience of an incorporated touchscreen interface. However, in some implementations, the user interface 36 of the cooking device 12 may include a display 112 and input devices 114, which could similar correspond to a touchscreen interface or a simple segmented display and discrete inputs. Accordingly, the specific device (e.g., cooking device 12, mobile device 16, remote server 30) that processes or completes various steps as described herein may vary among implementations.

In various applications, the cooking device 12 may comprise a wireless communication circuit 120 that facilitates the communication via one or more of the communication interfaces 22a, 22b. That is, wireless communication circuit 120 may provide for communication via the first communication interface 22a and/or the second communication interface 22b via one or more circuits. The first communication interface 22a may provide for a first communication protocol including, but not limited to, Bluetooth®, Bluetooth® Low Energy (BLE), Thread, Ultra-Wideband, Z-Wave®, ZigBee®, or similar communication protocols. The second communication interface 22b may provide for a second communication protocol including, but not limited to, global system for mobile communication (GSM), general packet radio services (GPRS), code division multiple access (CDMA), enhanced data GSM environment (EDGE), fourth-generation (4G) wireless, fifth-generation (5G) wireless, Wi-Fi, world interoperability for microwave access (WiMAX), local area network (LAN), Ethernet®, etc. Though discussed as implementing different wireless communication protocols, the first and second communication interfaces 22a, 22b may alternatively be implemented as a single, common interface and protocol.

As previously discussed, the operation of the cooking device 12 and the heating and calibration routines described herein may be controlled via one or more driving circuits 122. The driving circuits 122 may correspond to variable frequency control systems that control the operation of one or more power switching devices (e.g., metal oxide semiconductor field effect transistors [MOSFETs], junction gate FETs [JFETs], insulated-gate bipolar transistors [IGBTs], etc.) to control the switching frequencies for one or more heating elements 124, induction heating elements or induction coils of the cooking device 12. Accordingly, though discussed primarily in relation to an induction heating device, the disclosure may similarly be applicable to the cooking device 12 including one or more resistive heating elements or other heat sources. Additionally, the operation of the cooking device 12 may be monitored by the controller 20 in response to a current draw, voltage, or various signals, which may be incorporated in the calibration data to identify the response, material properties, and corresponding heating performance of the cooking vessel 14. The controller 20 may additionally monitor one or more temperature sensors 126 to detect the temperature response of the cooking vessel 14 throughout various cooking operations as well as the calibration routines. For example, the temperature sensor(s) 126 may be positioned within the cooking device 12 proximate to one or more hobs or heating positions on a cooking surface to identify the temperature response of the cooking vessel 14 as discussed herein.

According to the present disclosure, a cooking device is disclosed comprising a cooking surface configured to support a cooking vessel having at least one heating element disposed beneath the cooking surface and configured to generate heat in the cooking vessel, a communication circuit in communication with a database, and a controller in communication with a driving circuit of the at least one heating element and the communication circuit The controller is configured to access a calibration routine for the cooking vessel and, in response to the calibration routine, receive calibration data for the cooking vessel from the database and configure the operation of the at least one heating element for the cooking vessel in response to the calibration data.

According to another aspect of the present disclosure, the cooking device further comprises a mobile device comprising a camera in communication with the remote server.

According to yet another aspect of the present disclosure, the cooking device mobile device camera is configured to capture image data depicting the cooking vessel.

According to another aspect, the mobile device is configured to communicate the image data depicting the cooking vessel to the database.

According to yet another aspect, the cooking device is disclosed wherein the database is configured to identify the calibration data for the cooking vessel in response to the image data.

According to another aspect, the cooking device wherein the controller is further configured to process the calibration routine for the cooking vessel, wherein the calibration routine comprises controlling the driving circuit activating a plurality of driving frequencies of the at least one induction coil.

According to yet another aspect, the cooking device further includes at least one temperature sensor which is in communication with the controller, where the temperature sensor is configured to detect a temperature of the cooking surface proximate to the at least one heating element.

According to another aspect, the cooking device wherein the calibration routine further comprises monitoring the temperature sensor to identify a temperature response of cooking vessel in response to the plurality of driving frequencies of the at least one induction coil.

According to yet another aspect, the cooking device wherein the controller is further configured to identify a temperature response of the cooking vessel in response to the plurality of driving frequencies and identify the calibration data as a plurality of calibration coefficients relating the driving frequencies to the temperature response.

According to another aspect, the cooking device wherein the controller is further configured to communicate the calibration data to the remote server, wherein the calibration data is saved in a database identifying the calibration data associated with the image data depicting the cooking vessel.

According to yet a further aspect of the present disclosure, a method for calibrating an induction cooking device comprises capturing image data representing a cooking vessel; processing the image data to identify one or more features; comparing the image data representing the cooking vessel to a library of stored image data of calibrated cookware; in response to identifying stored image data in the library that matches the one or more features, accessing preconfigured calibration data; and configuring the operation of the induction cooking device based on the preconfigured calibration data.

According to another aspect, the method further comprises, in response to failing to identify stored image data in the library that matches the one or more features, initiating a local calibration procedure for the cooking vessel heated on the induction cooking device.

According to yet another aspect, the method further comprises generating local calibration data based on the local calibration procedure for the cooking vessel.

According to another aspect, the method further comprises communicating the image data representing the cooking vessel and the local calibration data to the library of stored image data of calibrated cookware.

According to yet another aspect, the method further comprises storing the image data representing the cooking vessel and the local calibration data in the library of stored image data as the preconfigured calibration data.

According to yet a further aspect of the present disclosure, a system for assisted calibration of an induction cooking device comprises a mobile device in communication with a remote server and comprising a camera configured to capture image data depicting a cooking vessel, wherein calibration data for the cooking vessel is accessed by the mobile device based on the image data; and a cooking appliance comprising a control module in communication with the remote server via a communication interface, wherein the control module receives the calibration data and loads the calibration data for a calibration procedure.

According to another aspect, a system is disclosed wherein an identification of the cooking vessel is completed based on the image data, and the calibration data is selected from a database based on the identification.

According to yet another aspect, a system is disclosed wherein an application operating on the mobile device controls the capture of the image data, retrieves the calibration data from the remote server, and stores the calibration data in a user profile, and wherein the calibration data is communicated to the control module of the cooking appliance from the remote server.

According to another aspect, a system is disclosed wherein the calibration procedure identifies an approximate temperature response of the cooking vessel in response to a heating output from at least one cooking hob of the cooking appliance.

According to yet another aspect, a system is disclosed wherein the control module is further configured to control an automated heating process for a food load identified in a predetermined recipe based on the calibration data.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking device comprising:
    a cooking surface configured to support a cooking vessel;
    at least one heating element disposed beneath the cooking surface and configured to generate heat in the cooking vessel;
    a communication circuit in communication with a database; and
    a controller in communication with a driving circuit of the at least one heating element and the communication circuit, the controller configured to:
        access a calibration routine for the cooking vessel;
        in response to the calibration routine, receive calibration data for the cooking vessel from the database;
        configure the operation of the at least one heating element for the cooking vessel in response to the calibration data;
        communicate with at least one temperature sensor, wherein the at least one temperature sensor is configured to detect a temperature of the cooking surface proximate to the at least one heating element; and
        monitor the at least one temperature sensor and identify a temperature response of the cooking vessel in response to a plurality of driving frequencies of the at least one heating element.

2. The cooking device according to claim 1, further comprising:
    a mobile device comprising a camera in communication with the database.

3. The cooking device according to claim 2, wherein the camera is configured to capture image data depicting the cooking vessel.

4. The cooking device according to claim 3, wherein the mobile device is configured to communicate the image data depicting the cooking vessel to the database.

5. The cooking device according to claim 4, wherein the database is a remote server configured to identify the calibration data for the cooking vessel in response to the image data.

6. The cooking device according to claim 1, wherein the controller is further configured to:
    process the calibration routine for the cooking vessel, wherein the calibration routine comprises controlling the driving circuit to activate the plurality of driving frequencies of at least one induction coil.

7. The cooking device according to claim 1, wherein the controller is further configured to:
    identify the temperature response of the cooking vessel in response to the plurality of driving frequencies and identify the calibration data as a plurality of calibration coefficients relating the driving frequencies to the temperature response.

8. The cooking device according to claim 7, wherein the controller is further configured to:
    communicate the calibration data to the database, wherein the calibration data is saved in a database identifying the calibration data associated with the image data depicting the cooking vessel.

9. A method for calibrating an induction cooking device comprising:
    capturing image data representing a cooking vessel;
    processing the image data to identify one or more features;
    comparing the image data representing the cooking vessel to a library of stored image data of calibrated cookware;
    in response to identifying stored image data in the library that matches the one or more features, accessing preconfigured calibration data relating a temperature of the cooking vessel to one or more driving frequencies of the induction cooking device;
    configuring the operation of the induction cooking device based on the preconfigured calibration data; and
    in response to failing to identify stored image data in the library that matches the one or more features, initiating a local calibration procedure for the cooking vessel heated on the induction cooking device.

10. The method according to claim 9, further comprising:
    generating local calibration data based on the local calibration procedure for the cooking vessel, the local calibration procedure comprising capturing temperature data at the one or more driving frequencies.

11. The method according to claim 10, further comprising:
    communicating the image data representing the cooking vessel and the local calibration data to the library of stored image data of calibrated cookware.

12. The method according to claim 11, further comprising:
    storing the image data representing the cooking vessel and the local calibration data in the library of stored image data as the preconfigured calibration data.

13. The method according to claim 10, wherein the local calibration procedure further comprises:
    communicating with a temperature sensor, where the temperature sensor is configured to collect temperature readings;
    identifying a temperature response of the cooking vessel to the one or more driving frequencies and corresponding temperature readings from the temperature sensor; and
    identifying calibration data relating the one or more driving frequencies to the temperature response.

14. A system for assisted calibration of an induction cooking device comprising:
    a mobile device in communication with a database and comprising a camera configured to capture image data depicting a cooking vessel, wherein calibration data for the cooking vessel is accessed by the mobile device based on the image data; and
    a cooking appliance comprising a control module in communication with the database via a communication interface, wherein the control module receives the calibration data and loads the calibration data from a calibration procedure, wherein the calibration procedure identifies an approximate temperature response of the cooking vessel in response to a heating output from at least one cooking hob of the cooking appliance and the calibration data comprises information relating a temperature of the cooking vessel to a driving frequency of the cooking appliance.

15. The system according to claim 14, wherein an identification of the cooking vessel is completed based on the image data, and the calibration data is selected from a database based on the identification.

16. The system according to claim 14, wherein an application operating on the mobile device controls the capture of the image data, a retrieval of the calibration data from the database and a storage of the calibration data in a user profile, and wherein the calibration data is communicated to the control module of the cooking appliance from the database.

17. The system according to claim 14, wherein the control module is further configured to control an automated heating process for a food load identified in a predetermined recipe based on the calibration data.

18. The system according to claim 14, further comprising:
in response to failing to identify the cooking vessel based on the image data, the control module processes a calibration routine, during which the control module:
activates a plurality of driving frequencies of at least one induction coil;
communicates with a temperature sensor to identify a temperature response of the cooking vessel to the plurality of driving frequencies; and
determines the calibration data relating the temperature response of the cooking vessel to the driving frequencies.

* * * * *